United States Patent
Jõgi et al.

(10) Patent No.: US 12,351,424 B2
(45) Date of Patent: Jul. 8, 2025

(54) CABLE FEEDING UNIT OF CABLE MANAGEMENT SYSTEM

(71) Applicant: SCALEUP OÜ, Kose (EE)

(72) Inventors: Alar Jõgi, Alliku (EE); Hendrik Aava, Tallinn (EE)

(73) Assignee: SCALEUP OÜ, Kose (EE)

( * ) Notice: Subject to any disclaimer, the term of this patent is extended or adjusted under 35 U.S.C. 154(b) by 440 days.

(21) Appl. No.: 17/941,164

(22) Filed: Sep. 9, 2022

(65) Prior Publication Data
US 2023/0098192 A1 Mar. 30, 2023

(30) Foreign Application Priority Data
Sep. 17, 2021 (EP) ..................................... 21197471

(51) Int. Cl.
*B65H 75/00* (2006.01)
*B65H 75/36* (2006.01)

(52) U.S. Cl.
CPC ......... *B65H 75/368* (2013.01); *B65H 75/366* (2013.01); *B65H 2402/42* (2013.01); *B65H 2701/34* (2013.01)

(58) Field of Classification Search
None
See application file for complete search history.

(56) References Cited

U.S. PATENT DOCUMENTS

| | | | |
|---|---|---|---|
| 9,180,954 B2 | 11/2015 | Glückhardt et al. | |
| 2002/0081083 A1* | 6/2002 | Griffioen | G02B 6/502 226/7 |
| 2002/0158239 A1* | 10/2002 | Griffioen | H02G 1/08 254/134.4 |
| 2011/0074351 A1* | 3/2011 | Bianco | B60L 53/31 320/109 |

FOREIGN PATENT DOCUMENTS

| | | | | | |
|---|---|---|---|---|---|
| JP | 2000102129 A | * | 4/2000 | | |
| KR | 102107338 B1 | * | 5/2020 | ............. | H02G 11/02 |
| RU | 2721019 C1 | * | 5/2020 | ............... | B21F 1/02 |
| WO | 2017221207 A1 | | 12/2017 | | |
| WO | WO-2019199178 A1 | * | 10/2019 | ............... | E02B 3/20 |

OTHER PUBLICATIONS

European Patent Office, Extended European Search Report, Application No. 21197471.2, mailed Feb. 22, 2022, 10 pages.
Sulligoi et al., "Shore-to-Ship Power" Proceedings of the IEEE, IEEE, New York, US vol. 103, No. 12, Dec. 1, 2015, XP011590362, ISSN: 0018-9219, DOI: 10.1109/JPROC.2015.2491647, 20 pages.

* cited by examiner

*Primary Examiner* — Emmanuel M Marcelo
(74) *Attorney, Agent, or Firm* — ZIEGLER IP LAW GROUP (57) ABSTRACT

A cable feeding unit (108) of a cable management system (100) comprising one or more feeding sections (200A, 200B, 200C, 200D, 302), having a body (202), a first side structure (208) and a second side structure (210), an inlet opening (212, 314) and an outlet opening (214) of a cable (124, 230, 410); one or more pairs of sheave rollers (216, 218, 220) attached between the first side structure and the second side structure; a cable feeding passage (222) formed at least between a rim part of the first sheave roller and a rim part of the second sheave roller of the one or more pairs of sheave rollers; one or more drives (160, 226A, 226B) connected to at least one of the sheave rollers; and one or more transmission mechanisms (224A, 224B) connecting the one or more drives with at least the first or second sheave roller.

14 Claims, 5 Drawing Sheets

CABLE FEEDING UNIT OF CABLE MANAGEMENT SYSTEM

TECHNICAL FIELD

The present disclosure relates generally to a high-voltage shore connection systems onboard the vessel or vehicle and on shore or station, to transfer electrical or data cables to the vessel or vehicle, more specifically to a cable feeding unit of a cable management system.

BACKGROUND

The market for marine vehicles, such as, ships, vessels, boats and the like are increasing day by day. More and more people are using such marine vehicles for travelling from one place to other or for transportation purposes. Thus, the number of ships and their frequency of visiting port has increased.

Typically, when ships come near the port, a main engine of the ship is turned off for saving power and auxiliary diesels generators positioned on the ship are used as a power source for operating the ship. Diesel generators may create pollution by emitting harmful gases such as, but not limited to, nitrogen oxides and Sulphur dioxides and particulate matter. This may make areas near the port unsuitable for residential purposes. In times when efforts are being made in order to not pollute the environment further, the use of diesel generators by the ships may be unacceptable. In order to make the air around the port area cleaner and suitable for nearby residents, electrical energy can be supplied to the ships when they arrive at ports. However, feeding multiple heavy cables to ships together is problematic to crews. Moreover, each plug can weigh up to twenty kilograms, and cables from six to fourteen kilograms per meter depending on power demand and particular situation. This makes supplying electrical energy to the vessel difficult. In order to mitigate the aforesaid problems cable management system (CMS) is used to supply electrical power to the vessels.

Typical CMS enables to transfer multiple power cables to a vessel's power connection cabinet only all cables together, that is, all cables are reeled in together. However, as discussed, power cables may be heavy and feeding them altogether may be difficult. For example, each plug of the power cables may weigh up to twenty-five kilograms, and each power cable may weigh five to twenty kilograms per meter depending upon power demand and particular situation. Quite often, it may be required that the power cable be reeled out from the CMS inside to the vessel from one to ten meters. I.e., the cable length inside the vessel from a boom of the CMS to sockets of a power connection such as, a hatch in the vessel may be one to ten meters. Feeding multiple heavy power cables from a cable reel through the hatch all together may, thus, be problematic to the crew because of the heavy weight of the power cables. Moreover, once the power cables are transferred and lifted up to the hatch of the vessel, a crew member in the vessel has to pull all the heavy cables through the hatch of the vessel to the power connection cabinet all together. I.e., the known solutions don't enable to reel the power cables into the vessel one by one. Due to the heavy weight of the power cables, multiple crew members may be needed to be able to pull the cables into the vessel. Herein, harsh weather conditions such as, wind, waves, ice, vessel movements may make this even more complicated. Furthermore, typically, the vessels can stop at the port only for a limited time. Thus, when the vessel arrives to the port, it may be very critical to connect the power cables to the power connection cabinet of the vessel as quickly as possible to use the time the vessel stays at the port for power transfer as efficiently as possible. Connecting heavy power cables may take a long time and thus, the vessel may lose valuable time. The cables to be fed into the cable connection cabinet of the vessel may include multiple supply power cables, neutral cable and data communication cables. Different vessels such as, container vessels, cruise ships and the like may have one or more hatches for a shore power room in different locations (e.g., the hatches may be located at the stern, bow or at the side of the hull) and need a different set of cables. Therefore, a solution is required to enable the crew members to connect the power cables and data communication cables one by one according to the vessel's need quickly and easily.

Therefore, in light of the foregoing discussion, there exists a need to overcome the aforementioned drawbacks of known techniques for supplying electrical power to the vessels when they arrive at ports.

SUMMARY

The present disclosure seeks to provide a cable feeding unit of a cable management system.

The present disclosure seeks to provide a solution to the existing problem of connecting multiple cables to a vessel power connection, which requires multiple crew members for pulling the power cables into the vessel. An aim of the present disclosure is to provide a solution that overcomes the problems encountered in prior art, and provides the cables from the cable management system through a hatch of the vessel to a power connection cabinet of the vessel.

In one aspect, an embodiment of the present disclosure provides a cable feeding unit of a cable management system, the cable feeding unit comprises one or more feeding sections, wherein the one or more feeding sections comprises a body having a first end and a second end, a first side structure and a second side structure between the first end and the second end, and an inlet opening of a cable in the first end, and an outlet opening of the cable in the second end; one or more pairs of sheave rollers attached between the first side structure and the second side structure, wherein the one or more pair of sheave rollers comprises a first sheave roller and a second sheave roller facing with rim parts to one another; a cable feeding passage formed at least between a rim part of the first sheave roller and a rim part of the second sheave roller of the one or more pairs of sheave rollers; one or more drives connected to at least one of the sheave rollers; one or more transmission mechanisms connecting the one or more drives with at least the first sheave roller or the second sheave roller Embodiments of the present disclosure substantially eliminate or at least partially address the aforementioned problems in the prior art, and enable efficient transfer of cables to vessels in the port or to the vehicles in the station.

Additional aspects, advantages, features and objects of the present disclosure would be made apparent from the drawings and the detailed description of the illustrative embodiments construed in conjunction with the appended claims that follow. The features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

According to an embodiment, the present disclosure provides a cable feeding unit of a cable management system, the cable feeding unit comprises one or more feeding sections, wherein the one or more feeding sections comprises a body having a first end and a second end, a first side structure and a second side structure between the first end and the second end, and an inlet opening of a cable in the first end, and an outlet opening of the cable in the second end; one or more pairs of sheave rollers attached between the first side structure and the second side structure, wherein the one or more pair of sheave rollers comprises a first sheave roller and a second sheave roller facing with rim parts to one another; a cable feeding passage formed at least between a rim part of the first sheave roller and a rim part of the second sheave roller of the one or more pairs of sheave rollers; one or more drives connected to at least one of the sheave rollers; one or more transmission mechanisms connecting the one or more drives with at least the first sheave roller or the second sheave roller.

The present disclosure relates to a cable feeding unit of a cable management system for transferring cables to an electrical connection in a vessel. Herein, the vessel may be a ship, a boat, a cruise ship, a yacht, a container vessel, a floating platform, an airplane and the like, that may float. In the alternative embodiments the cable feeding unit according to the present disclosure may be installed to the cable management system for transferring the cables to the trains or airplanes. The electrical connection may be sockets, plug points, hatch and the like that may be provided on the vessel. An electrical connection cabinet encompassing the electrical connection may be provided with a covering with an opening mechanism configured to open the covering when electrical power needs to be supplied to the vessel.

The cable management system (CMS) for supplying electrical power to the electrical connection in a vessel may comprise a cable reel having one or more cables reeled thereon for laying cables down on a surface of the port. Cable reels may be drum shaped structure around which one or more cables may be wound. The cable reels may be used for transporting the one or more cables reeled on it. The one or more cables may be electric cables, fibre optic cables and the like. Each cable of the one or more cables may have the first free end and the second free end. Each cable may be reeled out from either the first free end or the second free end. Cruise vessels may typically require four power cables and one neutral cable along with signal cables. Smaller vessels, such as, container ships, with less power requirement may require 1 to 4 cables. Optionally, the one or more cables comprises two or more cables. Herein, the two or more cables are reeled independent of each other on the cable reel. In an example, the one or more cables comprises two or more cables that are reeled independent of each other on the cable reel, each cable may be reeled in or reeled out independently irrespective of the other cables. The CMS may also have a boom having a first end and a second end. In different embodiments the boom of the CMS may be mounted on the ground, on the quay in the port or may be installed to the movable platform.

The cable management system (CMS) may further comprise a movable platform adapted to be movable alongside the vessel that needs the cables to be reeled in. The platform may be a geometrical structure on which the cable reel or the boom is mounted. As the vessel may come near a shore, the platform may be moved alongside the vessel. In an embodiment, the platform may be towed either manually or automatically by vehicles such as, but not limited to a tow truck, to move the platform alongside the vessel. In an alternative embodiment, the platform itself may be driven either manually or automatically to move alongside the vessel.

The cable feeding unit according to the embodiments of the present disclosure may be mountable to the boom of the cable management system (CMS) located at ports on quay close to water level for feeding shore power cables or data cables to the vessel. Alternatively, the cable feeding unit may be used for transferring the power cables to a power connection of an airplane, a train, a lorry and the like. The cable feeding unit is used for transferring the one or more cables all together or independently one by one from the CMS through a hatch of the vessel or vehicle to the electrical connection for supplying the vessel or vehicle with electricity or for power transfer power banks of the vessels when the vessel is at the port or the vehicle at the station. The one or more cables may be connected from an electrical station on a shore power room through the hatch of the vessel to the electrical connection of the vessel one by one or together, wherein the vessel may move during electrical connection and during power transfer. The cable feeding unit enables to provide the one or more cables at a side, stern or bow of the vessel. Optionally, the CMS may be driven by a truck to the suitable location on the quay or can be a self-driving or remotely controllable vehicle to move the cable reel into suitable location. The cable feeding unit may be adapted to accommodate cable feeding components. The cable feeding unit may be attachable to a portable or non-portable CMS. In the embodiments of the present disclosure the cable feeding unit may be operable in the following dimensions. Width of the CMS may be 2-4 meters, length of the CMS may be from 3-8 meters. Working zone of the boom of the CMS may be 3-8 meters and turning radius of the boom may be 360 degrees. Distance between the quay and the vessel may be 0.2-3.5 meters. Height of the hatch of the vessel may be 1-5 meters from the sea level, the height of the hatch of the vessel from the surface of the quay may be −5 to 5 meters. Operating height of the feeding unit 0.3-10 meters from the surface of the quay. According to the embodiments of the present disclosure, the cable feeding unit of the CMS may be adapted to reel in the one or more cables to the vessel and reel out the one or more cables from the vessel one by one or all together. According to the embodiments of the present disclosure, the cable feeding unit of the CMS may be operable in the temperature range −30 to +60 degrees by Celsius.

According to an embodiment, the cable feeding unit comprises one or more feeding sections. Herein, the one or more feeding sections comprises a body having a first end and a second end, a first side structure and a second side structure between the first end and a second end, and an inlet opening of the cable in the first end, and an outlet opening of the cable in the second end. Each feeding section of the one or more feeding sections may have a different set and configuration of cable feeding components. The body may be a housing, a housing having openings, an opened frame or a frame covered by body panels. The housing or a frame covered by the body panels is preferred to use in the conditions, wherein the inner components of the feeding section may need to be protected. The housing having openings or the opened frame enables better maintenance of the inner components of the feeding section. The first side structure and the second side structure between the first end and the second end side structure may be side walls of the body or supporting structures of the body. The inlet opening on the first end of the body of the feeding section is adapted to take in the one or more cables to be transferred to the vessel or vehicle and the outlet opening in the second end of the body of the feeding section is adapted to let out the one or more cables to be transferred to the vessel or vehicle.

According to the embodiment the one or more feeding sections further comprises one or more pairs of sheave rollers attached between the first side structure and the second side structure, wherein the one or more pair of sheave rollers comprises a first sheave roller and a second sheave roller facing with rim parts to one another. The one or more cables may be supported proximal to the respective second end thereof by the one or more pairs of sheave rollers in the one or more feeding sections. Herein, each pair of the one or more pairs of sheave rollers may include one or more rollers. The one or more rollers may be cylindrical having depressed curved faces. Two ends of the depressed curved faces of the roller may be raised to form the rim. The one or more feeding sections may support portions of the one or more cables proximal to the second end on the one or more pairs of sheave rollers in order to facilitate reeling out of the one or more cables from the second end by rotation of the one or more pairs of sheave rollers. The one or more pairs of sheave rollers provide a safe and good friction to move cables up and down, that is, to reel in the cables to the vessel or vehicle and reel out the cables from the vessel or vehicle. According to the embodiments, sheave rollers may be adapted to reel the one or more cables with diameter in the range of 1-10 centimetres for providing electrical power having nominal voltage from 110V to 20 kV, e.g., 400V, 440V, 690V, 6.6 kV or 11 kV and apparent power of 1-30 mega volt amperes (MVA).

According to the embodiment the one or more feeding sections further comprises a cable feeding passage formed at least between a rim part of the first sheave roller and a rim part of the second sheave roller of the one or more pairs of sheave rollers. By rim it is meant the surface of the roller on which the belt or chain runs. The first sheave roller and the second sheave roller comprise corresponding rim parts facing one another. In order to pass the cable, the cable feeding passage may be formed between at least the rim part of the first sheave roller and the rim part of the second sheave roller by maintaining a distance between the rim part of the first sheave roller and the rim part of the second sheave roller. Herein, the cable feeding passage may be formed in such a way that the cable may be supported on the curved faces of the first sheave roller and/or the second sheave roller. When the cable is reeled out or reeled in, the first sheave roller and the second sheave roller of the one or more pairs of sheave roller may rotate.

According to the embodiment the one or more feeding sections further comprises one or more drives connected to at least one of the sheave rollers. The one or more drives may be a device such as, an electrical motor, a hydraulic drive, an electric drive, a servo-motor and the like that may produce mechanical energy. At least one of the first sheave roller and the second sheave roller may be connected to the one or more drives so that the mechanical energy produced by the one or more drives may be transferred to the at least one of the sheave rollers. The drive can be connected to at least one of the sheave rollers directly or by means of a circumferentially elongated element or a shaft. The feeding section may comprise one, two, three, four or more pairs of sheave rollers, wherein at least one pair of sheave rollers or all pairs of sheave rollers may be motorized. In an embodiment, wherein the feeding section comprises one pair of sheave rollers the circumferentially elongated element is not necessary. In order to reel out or reel in the cable, the first sheave roller and the second sheave roller of the one or more pairs of sheave roller may be rotated. Force required for rotation of the first sheave roller and the second sheave roller of the one or more pairs of sheave rollers may be provided by the one or more drives. That is, the sheave rollers in the feeding section may be configured to rotate by means of the one or more drives to cause the cable to be reeled out of the CMS and traverse along the boom, such that the cable reaches out to the electrical connection in the vessel to be electrically connected therewith, for supplying the electrical power thereto. The power of the one or more drives may be selected according to the one or more cables so that the one or more drives may be able to drive the at least one of the sheave rollers to move the one or more cables.

In the embodiments wherein the feeding unit comprises two or more feeding sections, each feeding section may comprise a different number of pairs of sheave rollers. E.g., one feeding section may comprise four sheave rollers and other feeding section may comprise six feeding sheave rollers. Optionally, configuration of the sheave rollers may be different in each feeding section, e.g., in one feeding section all the sheave rollers may be motorized and in other feeding section some of the sheave rollers may be motorized and some sheave rollers may run freely. For example, two of six sheave rollers may be motorized and four sheave rollers may run freely. In different embodiments both sheave rollers of the pair of sheave rollers may be motorized or only one sheave roller of the pair of sheave rollers may be motorized. E.g., four sheave rollers can be connected to the circumferentially elongated element and two sheave rollers can be running freely.

Two or more cable feeding sections may be connected side by side by one or more connection bars attached perpendicular to feeding sections. The dimensions of the feeding section may be as follows: height 40-180 centimetres, width 10-56 centimetres and length 28-240 centimetres.

According to the embodiment, the one or more feeding sections further comprises one or more transmission mechanisms connecting the one or more drives with at least the first sheave roller or the second sheave roller. The transmission mechanisms may be formed of the pair of the sheave rollers and a drive, which when running one or both of the pair of the sheave rollers enable to reel the cable. Alternatively, the transmission mechanisms may be a circumferentially elongated element (such as a loop of a belt or a chain) or a shaft. The transmission mechanism may transfer the mechanical energy produced by the one or more drives to the connected sheave roller. The one or more transmission mechanisms may connect the one or more drives with at least the first sheave roller or the second sheave and may be tensioned on the one or more pairs of sheave rollers. That is, the transmission mechanisms may be positioned on the two or more sets of rollers tightly and the one or more cables may be supported on to it.

The cable feeding unit according to the present disclosure enables to provide the one or more cables one by one in such way that when the one or more cables are transferred to the electrical connection cabinet of the vessel, the cable feeding unit supports the cables so that the entire weight of the cable may not be pulled into the vessel by crew members. That is, the crew member is able to reel and pull the cables through the hatch into the vessel one by one more efficiently. More specifically, two or more cables can be reeled in and reeled out independently of each other. Thus, the embodiments according to the present disclosure provide a safe, fast and reliable way to connect the power connection cabinet of the vessel to shore power connection cabinet or shore power room electrical station on the shore. Further, the cable feeding unit provides the following additional advantages. First, using the cable feeding unit according to the present disclosure in the CMS makes the CMS operable by one person. This saves the labour force in the port and makes connecting the cables to the vessel faster and easier. Second, the CMS with the cable feeding unit requires a small distance between vessel and quay of about 3.5 meters. Third, to improve manoeuvrability the cable feeding unit may be operated both ways, that is, the cable feeding unit may move the cables back and forward, for example, when the power transfer has ended the cable feeding unit enables to remove the cables from sockets of the electrical connection. Fourth, compact construction of the cable feeding unit may enable to operate on the quay in the locations with limited space, thus, the risk to damage to other port equipment is reduced and does not limit operating of other devices and machines. Compact construction of the cable feeding unit thus enables the CMS to be installed to a ramp, platform on the shore, to a vessel's ramp or to the quay. Fifth, the cable feeding unit enables to compensate extreme tidal ranges. Sixth, modular design of combining multiple feeding sections may enable to reel in and reel out one or multiple cables side by side by one CMS. Different set and configuration of sheave rollers in each feeding section enable to choose suitable feeding section for each type and weight of cable to allow more smooth and effective reeling in and reeling out.

According to an embodiment, the one or more feeding sections comprises one or more supporting rollers. The supporting rollers may be free running and may be additionally attached inside the one or more feeding section to the first end or to the second end or to the first end and the second end. The supporting rollers help to support the cable when the cable is reeled in or reeled out. The supporting rollers may be especially effective in the embodiment wherein only one pair of sheave rollers is used. Additionally, depending on the cable type and weight, the supporting rollers may be attached also between the one or more pairs of sheave rollers below the cable feeding passage to provide further support to the cables to be reeled and transferred to or from the vessel.

According to an embodiment, the one or more transmission mechanisms comprises a shaft or a drive pulley connecting the one or more drives with at least the first sheave roller or the second sheave roller. The one or more drives, such as, the electrical motor, may be a device that may produce mechanical energy. For example, when electrical energy is provided to the electrical motor, the shaft of the motor rotates. The shaft may be connected to at least the first sheave roller or the second sheave roller via the one or more transmission mechanisms. The one or more transmission mechanisms may be circumscribed and tensioned on the one or more pairs of sheave rollers and the shaft. The one or more cables may be supported on the one or more transmission mechanisms. In order, to reel out the one or more cables, the one or more pairs of sheave rollers may be rotated so that the one or more transmission mechanisms move. The rotation of the one or more pairs of sheave rollers may be facilitated by rotation of the shaft of the one or more drives. Herein, the one or more transmission mechanisms may be tensioned on the shaft. Hence, as the shaft rotates, the one or more transmission mechanisms tensioned on the shaft may rotate and may force the one or more pairs of sheave rollers to rotate. This causes movement of the one or more transmission mechanisms and the one or more cable supported on the one or more transmission mechanisms to be reeled out.

According to an embodiment, the one or more feeding sections comprises two or more pairs of sheave rollers attached between the first side structure and the second side structure and two or more transmission mechanisms comprising at least one first circumferentially elongated element and at least one second circumferentially elongated element; and the at least one first circumferentially elongated element is arranged around the rim parts of two or more of the first sheave rollers and the at least one second circumferentially elongated element is arranged around the rim parts of two or more of the second sheave rollers. The circumferentially elongated element is for example a chain or a belt. For two or more pairs of sheave rollers, each pair comprises at least one first sheave roller and at least one second sheave roller. Thus, the one or more feeding sections comprise two or more first sheave rollers and two or more second sheave rollers. The first circumferentially elongated element may be arranged around the rim parts of two or more first sheave rollers and the second circumferentially elongated element may be arranged around the rim parts of two or more second sheave rollers. The one or more cable may be arranged on the first circumferentially elongated element and the second circumferentially elongated element. Using two or more pairs of sheave rollers instead of one helps in reeling in and reeling out of the one or more cables easily and quickly. This is due to greater movement of the one or more pairs of sheave rollers. For example, if one of the first sheave rollers is rotated by the one or more drives, due to the first circumferentially elongated element connecting the two or more first sheave roller, other of the first sheave roller may also rotate and hence, the movement of the first circumferentially elongated element may be larger giving rise to quicker reeling in and reeling out of the one or more cables.

According to an embodiment, the at least one of the first circumferentially elongated element or at least one of the second circumferentially elongated element comprises a tensioner. The tensioner may be configured to apply tension to at least one of the first circumferentially elongated element or at least one of the second circumferentially elongated element. At least one first circumferentially elongated element and at least one second circumferentially elongated element may slip and may wear out prematurely in the absence of the tensioner. This prevents reeling out of the one or more cables. Similarly, too much tensioning on the at least one first circumferentially elongated element and at least one second circumferentially elongated element results in excessive force on the at least one first circumferentially elongated element and the at least one second circumferentially elongated element and the shaft. The excessive force on the at least one first circumferentially elongated element and at least one second circumferentially elongated element may get transferred to the one or more cables which may cause wear out of the one or more cables. Thus, the tensioner helps to maintain, optimum tension to keep the at least one first circumferentially elongated element and at least one second circumferentially elongated element tensioned on the shaft of the one or more drive and the one or more pairs of sheave rollers. The at least one first circumferentially elongated element and the at least one second circumferentially elongated element and/or the tensioner may be adjusted automatically or manually. In an embodiment, there may be an automatic belt tension detector to detect required tension of the at least one first circumferentially elongated element and the at least one second circumferentially elongated element. In an alternative embodiment, the tension of the at least one first circumferentially elongated element and the at least one second circumferentially elongated element may be checked by the crew member to find out whether the at least one first circumferentially elongated element and the at least one second circumferentially elongated element needs to be tensioned or not.

According to an embodiment, the cable feeding passage is formed between the at least one first circumferentially elongated element arranged around the first guiding rollers and the at least one second circumferentially elongated element arranged around the second guiding rollers. In the embodiments, wherein the one or more feeding sections comprises two or more pairs of sheave rollers, the cable feeding passage may be formed between the at least one first circumferentially elongated element arranged around the first guiding rollers and the at least one second circumferentially elongated element arranged around the second guiding rollers. This is, at least one first circumferentially elongated element and the at least one second circumferentially elongated element may be circumscribed and tensioned on two or more guiding rollers and the cable may be supported by the at least one first circumferentially elongated element and the at least one second circumferentially elongated element in the one or more feeding sections when the cable is transferred through the hatch of the vessel or vehicle and connected to the sockets in the vessel or vehicle. Thus, by adapting the two or more guiding rollers to be rotating, the at least one first circumferentially elongated element and the at least one second circumferentially elongated element will move, resulting in easy reeling in and reeling out of the cables.

According to an embodiment, the at least one sheave roller comprises a roller tensioner. The roller tensioner enables to apply tension to the at least one sheave roller by applying force. The roller tensioner is adapted to apply optimum tension to the at least one sheave roller so as to protect other components such as, one or more drive, one or more transmission mechanisms and the one or more cables.

According to an embodiment, the two or more pairs of sheave rollers comprises at least one pair of driving rollers and at least one pair of driven rollers. For example, in some embodiments, at least one pair of sheave rollers comprises driving sheave rollers and at least one pair of sheave rollers comprises driven sheave rollers. The feeding section may also comprise pairs of sheave rollers, wherein one of the sheave rollers is driving sheave roller and second sheave roller is driven sheave roller. Herein, the at least one pair of driving rollers may be connected to the one or more drives and the at least one pair of driven rollers may be connected to the at least one pair of driving rollers by the circumferentially elongated elements. The sheave rollers can be driving sheave rollers or driven rollers which move freely. The at least one pair of driven rollers may be rotated due to the one or more drives. The use of at least one pair of driving rollers and at least one pair of driven rollers may limit the use of one or more drives for each sheave roller. At least the first sheave roller or the second sheave roller, which may be the driving roller, may be connected to the one or more drives and the rest of the sheave rollers and thus may be driven due to rotation of the driving rollers.

According to an embodiment, the drive is a hydraulic drive, an electric drive, a servo-motor, an actuator. The hydraulic drive may use pressurized hydraulic fluids to drive or rotate the connected at least the first sheave roller or the second sheave roller. The electric drive may include an electric motor that may produce the mechanical energy required to drive the connected at least the first sheave roller or the second sheave roller from supplied electrical energy. Servo-motor may include motors and servo mechanisms to control velocity and acceleration of the connected at least the first sheave roller or the second sheave roller. The actuator may be a device that may convert electrical energy, hydraulic energy, and the like into mechanical force required for rotating the connected at least the first sheave roller or the second sheave roller. The drive may provide the mechanical force needed to rotate the connected at least the first sheave roller or the second sheave roller for reeling in or reeling out the one or more cables.

According to an embodiment, the drive is connected by a rotating shaft with at least one sheave roller, or the drive is integrated inside the one or more sheave guiding rollers. Herein, the rotating shaft may be a cylindrical structure. The drive may be configured to rotate the rotating shaft. The rotating shaft may be connected to the at least one sheave roller causing the at least one sheave roller to rotate when the rotating shaft rotates. Herein, the one or more transmission mechanism such as, a driving belt may be tensioned on the rotating shaft of the motor and the rotating shaft may cause the rotation of the one or more pairs of sheave rollers in the one or more feeding sections. Alternatively, the drive may be integrated inside the one or more sheave guiding rollers.

Herein, the drive may rotate the one or more sheave guiding rollers directly in order to reel in or reel out the one or more cables.

According to an embodiment, the one or more feeding sections comprises at least one of: a camera, an anti-collision means, an adaptive reeling means, a data communication means, one or more control means of the drives, a remote diagnostics means. The camera may comprise wired or wireless connection to a monitoring screen. The camera may enable to monitor reeling in and reeling out operations via the monitoring screen. The camera, anti-collision means, adaptive reeling means such as, one or more inductive sensors, acoustic sensors, lasers, proximity sensors, touch sensors may be attached to the body of the one or more feeding sections. The one or more control means of the feeding unit of the CMS may be wired or may be a radio control means for operating the reeling in and reeling out operation. Remote diagnostics may be carried out via the remote diagnostics means over for example, 4G, over secure VPN. The cable feeding unit also enables to compensate tidal ranges up to +/−8 meters. This may be combined with reeling in and reeling out together with the boom movements. The adaptive reeling means may enable to detect high tides and low tides and according to the high tide or low tide, the adaptive reeling means may regulate a reeling speed to reel in or reel out the one or more cables. A reeling speed may be 0.02 to 2.07 meters per second (m/s), wherein average reeling speed may be 0.50 to 1.25 (m/s). I.e., the reeling speed can thus be from 0.02, 0.12, 0.22, 0.32, 0.42, 0.52, 0.62, 0.72, 0.82, 0.92, 1.02, 1.12, 1.22, 1.32, 1.42, 1.52, 1.62, 1.72, 1.82 or 1.92 up to 0.07, 0.17, 0.27, 0.37, 0.47, 0.57, 0.67, 0.77, 0.87, 0.972, 1.07, 1.17, 1.27, 1.37, 1.47, 1.57, 1.67, 1.77, 1.87, 1.97 or 2.07 m/s and the average reeling speed can thus be from 0.5, 0.6, 0.7, 0.8, 0.9, 1.0 or 1.1 up to 0.55, 0.65, 0.75, 0.85, 0.95, 1.05, 1.15 or 1.25 m/s. The anti-collision means, for example, the proximity sensor, may be configured to detect proximity of the vessel to the cable feeding unit to avoid cable feeding unit collision with the vessel. In some other embodiments, the anti-collision means may be a fender or a bumper. The data communication means may support monitoring and controlling the CMS and cable feeding unit of the CMS. The control means may enable to switch on and switch off the drives and may regulate the reeling speed of the motorized sheave rollers. The remote diagnostics means may be necessary for detecting the maximum cable tension and reel out detection for security purposes to enable cable emergency warning and reeling shutdown.

According to an embodiment, the cable feeding unit comprises connection means to connect the cable feeding unit with a boom of the cable management system. Preferably, the connection means may be a hanging pin joint that may allow the cable feeding unit to sway. The swaying of the cable feeding unit may help the cable feeding unit to reach the electrical connection of the vessel. Moreover, the swaying may help the cable feeding unit to move, and thereby absorb forces, in case of high winds, or movement of the vessel due to the high tide or the low tide. A rigid connection to the cable feeding unit may get damaged in such cases.

According to an additional embodiment, the one or more cable guiding rollers are attached at least to the inlet opening or the outlet opening. The one or more cable guiding units provide direction to cable to be reeled so that cable moves through its centre. The one or more cable guiding rollers that are attached near the inlet opening helps the cable to enter the cable feeding unit and follow the cable feeding passage. The one or more cable guiding rollers that are attached near the outlet opening help the cable to exit the cable feeding unit from the outlet opening.

According to an embodiment, the first end of one or more feeding sections comprises at least one fender. The at least one fender may be attached to the cable feeding unit to protect the cable feeding unit from the vessel's wall when the cable feeding unit moves against the vessel's wall. The fender protects the cable feeding unit by absorbing impact if the cable feeding unit may hit the vessel. In an example, the cable feeding unit comprises two or more feeding sections, the at least one fender may be attached to each one or more feeding sections or at least to a first and last feeding sections. According to an embodiment, the second end comprises one or more bumpers. The one or more bumpers at the second end of the feeding unit enables to protect the cables by preventing that the cables does not move against the feeding unit. The at least one fender and the one or more bumpers may thus protect internal components of the body of the feeding unit by absorbing collision impact when the feeding unit collides with an obstruction such as, the vessel's wall, the cables or the boom.

In additional embodiments, one or more springs may be provided in the feeding unit for tensioning one or more pairs of sheave rollers to ensure friction between the cable and the sheave rollers.

The platform comprising a boom having a first end and a second end rotatably mounted on the platform from the first end thereof allows the second end to be movable in a direction alongside the vessel. The boom of the CMS may comprise a first structure having a first end and a second structure having a second end. The first structure and the second structure of the boom may be mechanically coupled via pivot joint to allow for folding of the boom, and thereby disposing the cable management system between an non-operational position and operational position thereof. The mechanical coupling may allow folding the boom when not in use so as to obtain a non-operational position. This may make the boom compact and the folded boom may be used for transportation purposes. Alternatively, when the boom is in use, the mechanical coupling may be configured to allow movement of the second structure by some angle, say 180 degrees from the non-operational position. The first end of the boom may be mounted on the platform and may be mechanically coupled to allow rotation of the boom along the first end so that the second end may be movable in the direction alongside the vessel. For example, if the vessel moves towards a left direction, the first end of the boom may be rotated so that the second end of the boom follows the movement of the vessel along the left direction. The one or more cables may be supported on the boom so that as when the one or more cables is reeled out or reeled in from the second free end of each cable, the one or more cables may traverse along the boom.

The boom of the CMS may be configured to be operated to rotate to enable the cable feeding unit to be disposed adjacent to the electrical connection in the vessel. As discussed, the boom may be rotated about the first end. Once the platform is moved and brought near the vessel, the movement of the platform may be stopped and the boom may be disposed of from the non-operational position to its operational position. The boom may need to be rotated about the first end so that the cable feeding unit is disposed adjacent to the electrical connection in the vessel so that electrical connection with the vessel may be made easily. Even after the cable feeding unit is disposed adjacent to the electrical connection in the vessel, there may still be some distance between the cable feeding unit and the electrical connection in the vessel. Thus, the one or more cables may be reeled out from the second end so as to reach the electrical connection in the vessel. In order to reel out the one or more cables at least one or more pairs of sheave rollers may be employed. Each of the one or more cables may be adapted to be electrically connected to the shore connection cabinet from the first free end thereof to receive the electrical power therefrom.

Optionally, the boom may comprise one or more grooves formed therein. Herein, the cable may be supported in the said one or more grooves when traversed along the boom. It may be appreciated that the one or more grooves may be formed by creating one or more depression along the boom. The one or more grooves may support the one or more cable and may ensure that the one or cables traverse along the boom. Otherwise, the one or more cables may slip out when the one or more cables are reeled in or reeled out.

Optionally, the boom may be rotatable about a vertical axis from the first end thereof, with respect to the platform. Herein, the vertical axis may be perpendicular to the platform at the first end of the boom. As discussed, the boom is rotatably mounted on the platform from the first end thereof to allow for the second end thereof to be movable in the direction alongside the vessel. In order to do so, the boom may be rotatable about the vertical axis at the first end. For example, if the vessel moves right side, the first end may be rotated along the vertical axis towards the right side so that the second end follows the right-side movement of the vessel.

Optionally, the boom may comprise one or more bend restrictors provided along the length of the cable proximal to the second end. It may be appreciated that bending of the cable could alter capacitance and inductance of the cable and may cause electrical hazards, such as sparks. If the cable is used for fuel supply, the bending of the cable could restrict the movement of the fuel inside the cable. Hence, one or more bend restrictors may be provided. The bend restrictors may be employed for preventing bending of flexible materials such as, flexible cable herein. As discussed, the cable proximal to the second end may be supported on the boom. One or more bend restrictors may be provided along the length of the cable proximal to the second end that are supported on the boom to prevent bending of the cable.

The boom of the CMS may be mounted on the ground or on the quay in the port. The second end of the boom may be mechanically coupled to the cable feeding unit. The CMS may comprise the platform which may be movable, wherein the boom is rotatably mounted on the platform from the first end thereof to allow for the second end to be movable next to the vessel. The platform of the CMS may be adapted to be movable on the shore or on the quay. According to the embodiments of the present disclosure the feeding unit can be mounted at the second end of the boom.

The CMS may further comprise one or more outriggers associated with the platform, wherein the one or more outriggers are configured to be deployed to stabilize the platform when the boom is rotated so as to cause the feeding unit to be disposed adjacent to the electrical connection in the vessel. Outriggers may be pads used for balancing load of the boom. As the boom extends from its non-operational position and rotates to cause the cable feeding unit to be disposed adjacent to the electrical connection in the vessel, weight of the boom and the cable feeding unit may unbalance the platform. In such cases, chances of turning over of the boom and the platform may be high. Hence, outriggers may be employed to balance the weight of the boom and the cable feeding unit on the ground. Herein, the outriggers may stabilize the platform and prevent turning over of the platform. It may be further noted that in the non-operational position the one or more outriggers may be folded and may not be deployed for transportation purposes of the platform.

Optionally, the one or more outriggers comprises two outriggers configured to be independently deployed based on a direction of rotation of the boom with respect to the platform. According to the direction of rotation of the boom, a disbalance point at which the weight of the boom and the platform is directed may change and hence, any one outrigger of the two outriggers may be deployed independently. For example, in an embodiment, a first outrigger is positioned on a front portion of the platform and a second outrigger is positioned on a back portion of the platform. If the direction of rotation of the boom with respect to the platform is towards the right side, then the disbalance point of the platform may be in the front portion of the platform. In such cases, only outriggers at the front portion of the platform may be deployed so that the platform does not turn over from the front. Similarly, if the direction of rotation of the boom with respect to the platform is left side, then the disbalance point of the platform may be in the back portion of the platform. In such embodiments, only outriggers at the back portion of the platform may be deployed so that the platform does not turn over from the back. Thus, instead of using both outriggers always any one of them may be deployed as required.

In an embodiment, to reel in the cables, e.g., supply power cables and neutral cable, into the power connection cabinet of the vessel, the cables may be unlinked from CMS and set aside to shore connection cabinet. The CMS supply power cable may be connected to the shore connection cabinet. The CMS may be moved forward, either automatically or by tow truck and the cable may be reeled to the hatch of the hatch of the vessel automatically with moving speed. Once reeling is completed, the tow truck may not be required to operate the CMS. Supply power cables, neutral cable and data communication cables may be reeled to the hatch of the vessel and may be pulled one by one by a second crew member through the hatch to the power connection cabinet of the vessel and connected to the respective sockets in the vessel connection cabinet. During the same operation, the one or more data communication cables may be reeled in to the vessel when CMS is at working location.

For positioning the CMS and the cable feeding unit, the CMS and the cable feeding unit may be controlled from the quay by a first crew member via remote control. Communication between the CMS and a vessel operator or the second crew member may be done through e.g., radio transmitters. For operating the boom, outriggers may be moved out and CMS may be levelled. The boom may be moved to the hatch of the vessel. One or more cables may be reeled in to the vessel one by one through the hatch of the vessel and may be connected to the sockets in the vessel. Tidal compensation may be handled via excess cable loop and CMS is ready to provide shore power.

When the vessel is brought near the shore and the electrical energy is being supplied, the vessel may still move either due to tides or due to movement of the vessel by the vessel operator. In such cases, the electrical connection in the vessel may be disrupted. As the vessel moves, the one or more cables may be stretched and the electrical connection in the vessel may be disconnected. In order to do away with the aforesaid problems, excess cables may be reeled out. In an embodiment, excess cable may be reeled out and the excess reeled cable may be in the form of a loop between the second end of the boom and the cable feeding unit.

Once usage of the shore power is completed, the vessel operator may disconnect supply power cables and neutral cable from the vessel connection cabinet, the data communication cables from the connections and may give a command to the crew members to start reeling out the cables. The drives of the cable feeding unit may be switched on by the first crew member via the remote control to start rolling out the cables and all the cables may be reeled out from the vessel connection cabinet one by one by the cable feeding unit.

The number of one or more cables needed for the vessel may differ from vessel to vessel. For example, the cruise vessels may require four power cables, one neutral cable and one or more data communication cables, wherein the one or more data communication cables can be one or more umbilical cables. The cruise vessel may use shore power as either 6.6 volts, 6 Kilovolts or 11 kilovolts systems with apparent power of 16 megavolt amperes to 20 megavolt amperes. According to some other embodiments, the vessels such as, smaller vessels, container ships or the like may have less power requirement, thus requiring one to four cables for example. The cable feeding unit according to the embodiments of the present disclosure is used for transferring cables close to the hatch of a vessel in situations where different vessels are visiting port. Thus, the cable feeding unit according to the embodiments of the present disclosure enables to solve the problem wherein different cable management systems are needed for different types of vessels. This, in turn enables to save operating space and power supply time in the ports.

The cable feeding unit may be employed in a number of applications. First, they may be used for cruise vessels in ports taking in cruise ships. Quite often different vessels have hatches in different locations and therefore, mobile solution is required that may be provided by the cable feeding unit and the CMS of the present disclosure. Second, the cable feeding unit of the present disclosure may be used for lifting cables close to the electrical connection such as, shore power hatch on the vessel in situations where different vessels are visiting port. Third, the cable feeding unit may be also used for transferring liquids, fuels such as diesel, gasoline and hydrogen and removing waste water. Fourth, the cable feeding unit may be used in multiple port devices. Herein, multiple cable feeding units of the present disclosure may be used side-by-side. For example, one cable feeding unit may be used for supplying electrical power, another one for supplying fuel and still another one for supplying water.

The cable feeding unit of the present disclosure is advantageous as it helps the CMS to provide efficient supply of the electrical power to the electrical connection in the vessel. The cable feeding unit may be the mobile solution with zero emissions and may be operated by one crew member. Moreover, the one or more cables may be reeled in or reeled out separately or together. Furthermore, the cable feeding unit may be designed and built to resist harsh environments and may require a small distance such as, up to 3.5 meters between the vessel and the shore. Also, to improve manoeuvrability the platform may be towed in both ways. The one or more pairs of sheave rollers may provide safe and good friction to move the one or more cables up and down for reeling in and reeling out respectively. The cable feeding unit has modular design and may be suitable for one-to-many side by side cables.

DETAILED DESCRIPTION OF THE DRAWINGS

Figure 1:
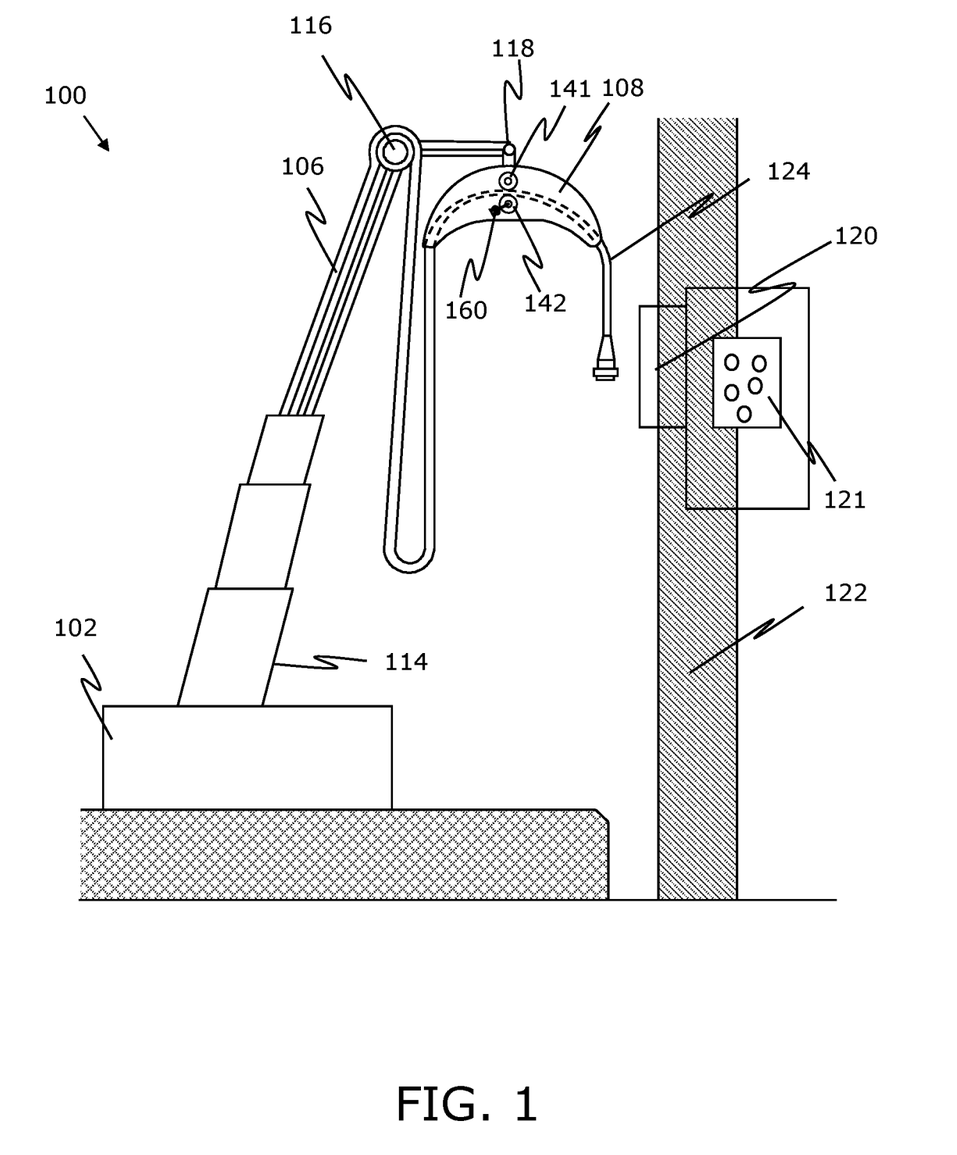
FIG. 1 is a diagrammatic view of a feeding unit of the cable management system in operation, in accordance with an embodiment of the present disclosure.

FIG. 1 is a diagrammatic view of a feeding unit 108 of the cable management system 100 in operation, in accordance with an embodiment of the present disclosure. The cable feeding unit 108 comprises a cable feeding section comprising a first sheave roller 141 and a second sheave roller 142 facing with rim parts to one another, a drive 160 connected the second sheave roller 142 forming with the sheave rollers a cable transmission mechanism, and wherein a cable feeding passage is formed between a rim part of the first sheave roller 141 and a rim part the second sheave roller 142. The cable management system 100 includes a platform 102, a boom 106 having a first end 114 and a second end 116 rotatably mounted on the platform 102 from the first end 114 to allow for the second end 116 thereof to be movable in a direction alongside the vessel 122. The cable feeding unit 108 further comprises connection means 118 for hanging the cable feeding unit 108 onto the second end 116 of the boom 106. The boom 106 is extended and is operated to dispose of the cable feeding unit 108 adjacent to a hatch 120 of an electrical connection cabinet 121 in a vessel 122. One or more cables 124 is reeled out so as to reach the electrical connection cabinet 121 of the vessel 122.

Figure 2A:
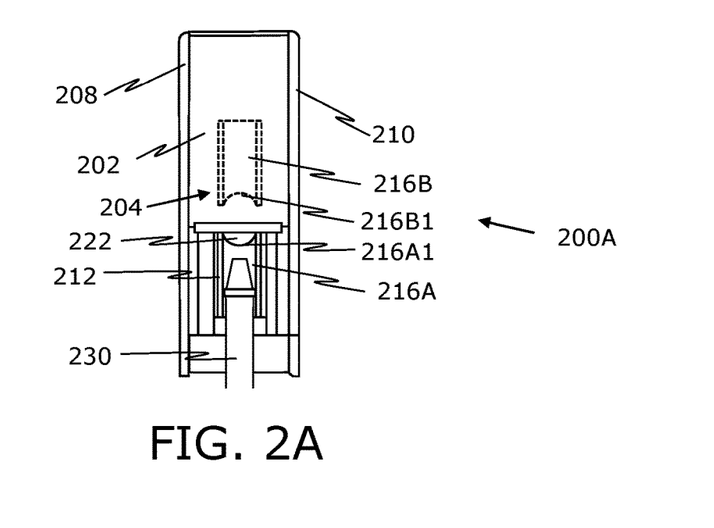
FIG. 2A is a front view of a feeding section of a cable feeding unit according to an embodiment of the present disclosure.

FIG. 2A is a front view of a feeding section 200A of the cable feeding unit 108 of FIG. 1A, in accordance with an embodiment of the present disclosure. Each cable feeding unit 108 comprises multiple feeding sections such as, the feeding section 200A, mechanically coupled to the adjacent feeding sections. The feeding section 200A comprises a body 202. The embodiment of the body 202 shown on FIG. 2A illustrates a first end 204 of the body, a first side structure 208 and a second side structure 210, and in the first end 204 an inlet opening 212 of a cable 230 to be transferred. The body 204 further comprises a pair of sheave rollers comprising a first sheave roller 216A and a second sheave roller 216B, wherein the first sheave roller 216A and the second sheave roller 216B are attached between the first side structure and the second side structure, facing with rim parts 216A1 and 216B1 to one another. Between the rim parts 216A1 and 216B1 a cable feeding passage 222 is formed.

Figure 2B:
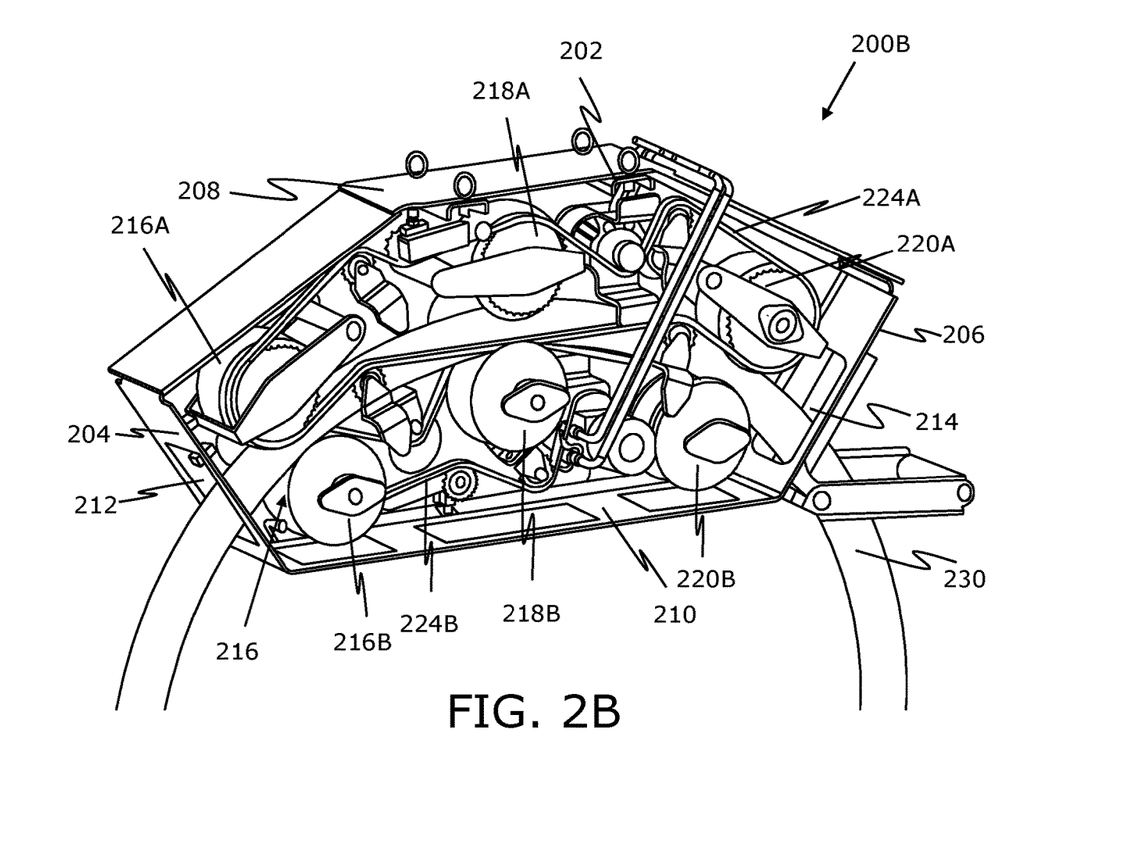
FIG. 2B is a sectional view of the feeding section of FIG. 2A, in accordance with an embodiment of the present disclosure.

FIG. 2B is a sectional view of a feeding section 200B of the cable feeding unit 108 of FIG. 2A, in accordance with an embodiment of the present disclosure. As shown, the feeding section 200B comprises the body 202 having a first end 204, a second end 206, a first side structure 208 and a second side structure 210 between the first end 204 and the second end 206, an inlet opening 212 of the cable in the first end 204, and an outlet opening 214 of the cable in the second end 206. The feeding section 200B further comprises a first pair of sheave rollers 216 comprising a first sheave roller 216A and a second sheave roller 216B, a second pair of sheave rollers comprising a first sheave roller 218A and a second sheave roller 218B and a third pair of guiding rollers comprising a first sheave roller 220A and a second sheave roller 220B, attached between the first side structure 208 and the second side structure 210. A cable 230 is transferred through the feeding passage formed a rim part of the first sheave rollers 216A, 218A, 220A and a rim part of the second sheave roller 216B, 218B, 220B. A first circumferentially elongated element 224A is arranged around the rim parts of first sheave rollers 216A, 218A and 220A and second circumferentially elongated element 224B is arranged around the rim parts of second sheave rollers 216B, 218B and 220B.

Figure 2C:
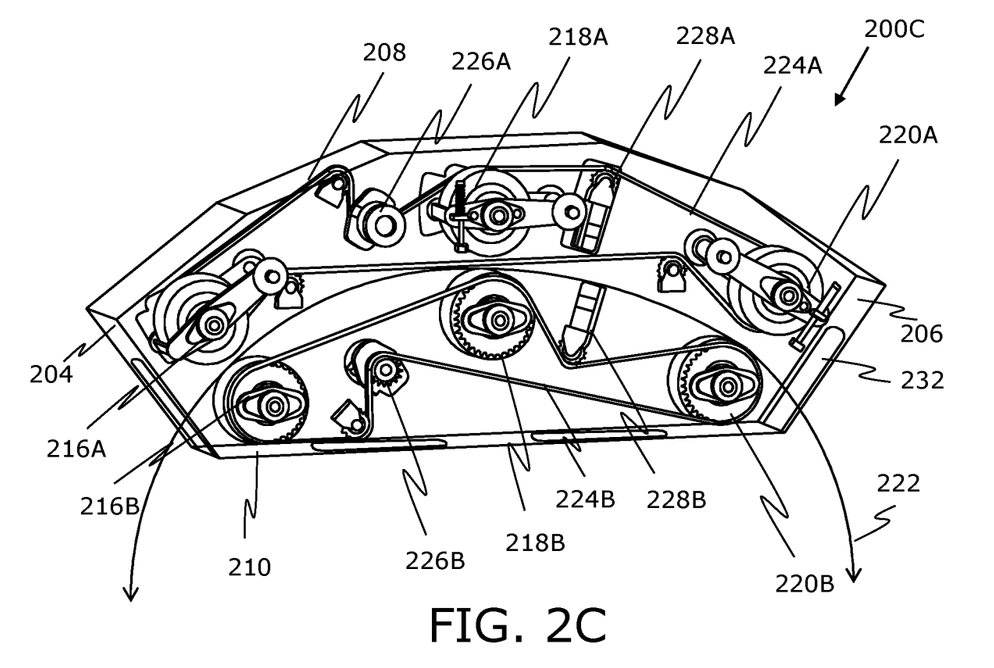
FIG. 2C is a sectional view of the feeding section of FIG. 2A, in accordance with another embodiment of the present disclosure.

FIG. 2C is a sectional view of a feeding section 200C of the cable feeding unit 108 of FIG. 2A, in accordance with another embodiment of the present disclosure. The feeding section 200C further includes a first drive 226A connected to the first sheave roller 216A, a second drive 226B connected to the second sheave roller 216B, a first tensioner 228A and a second tensioner 228B configured to keep the first circumferentially elongated element 224A and the second circumferentially elongated element 224B tensioned on rotating shaft of the first drive 226A and the second drive 226B respectively. A cable feeding passage 222 is formed between a rim part of the first sheave rollers 216A, 218A, 220A and a rim part of the second sheave roller 216B, 218B, 220B. A cable to be transferred is supported in the cable feeding passage 222 by the second circumferentially elongated element 224B in the feeding section 200C. Herein, as the rotating shaft of second drive 226B rotates, the second circumferentially elongated element 224B moves and thereby causes rotation of the second sheave rollers 216B, 218B and 220B. The rotation of the second sheave rollers 216B, 218B and 220B eventually help to move the second circumferentially elongated element 224B which eventually leads to reeling out of the cable to be transferred. The feeding section 200C comprises a supporting roller 232 for supporting the cable to be transferred in the cable feeding passage 222.

Figure 2D:
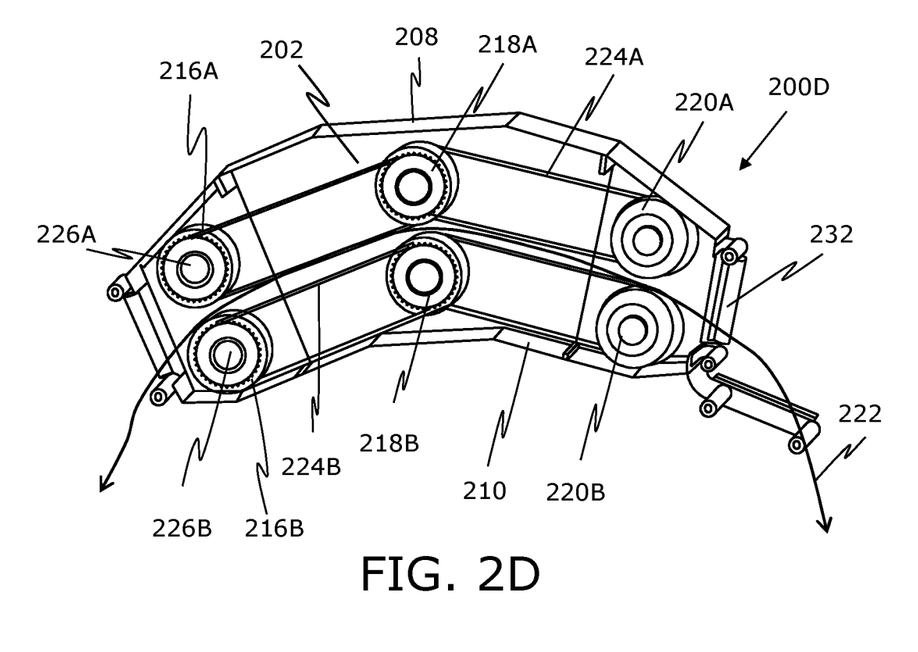
FIG. 2D is a sectional view of the feeding section of FIG. 2A, in accordance with yet another embodiment of the present disclosure.

FIG. 2D is a sectional view of a feeding section 200D of the cable feeding unit 108 of FIG. 2A, in accordance with yet another embodiment of the present disclosure. Herein, the first drive 226A is integrated inside the first sheave roller 216A and the second drive 226B is integrated inside the second sheave roller 216B. Thus, the feeding section 200D is more compact as compared to the feeding section 200C of FIG. 2C.

Figure 3A:
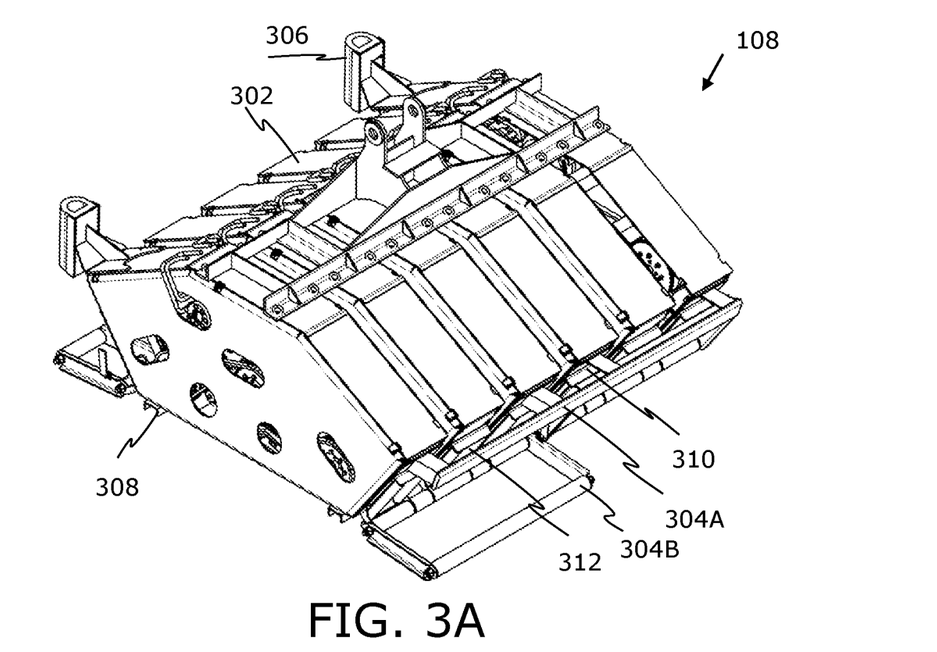
FIG. 3A is a perspective view illustration of the cable feeding unit of the cable management system of FIG. 1, in accordance with an embodiment of the present disclosure.

FIG. 3A is a perspective view illustration of the cable feeding unit 108 of the cable management system 100 of FIG. 1, in accordance with another embodiment of the present disclosure, wherein the cable feeding unit 108 includes six feeding sections 302, one or more bumpers 304A, 304B, a fender 306, a bottom beam 308, a sensor frame 310 and a guiding block 312. The bottom beam 304 may support the one or more feeding of the six feeding sections 302. The sensor frame 310 includes a plurality of sensors such as, an anti-collision sensor, an adaptive reeling sensor, a data communication sensor, one or more control sensors of the drives and the like.

Figure 3B:
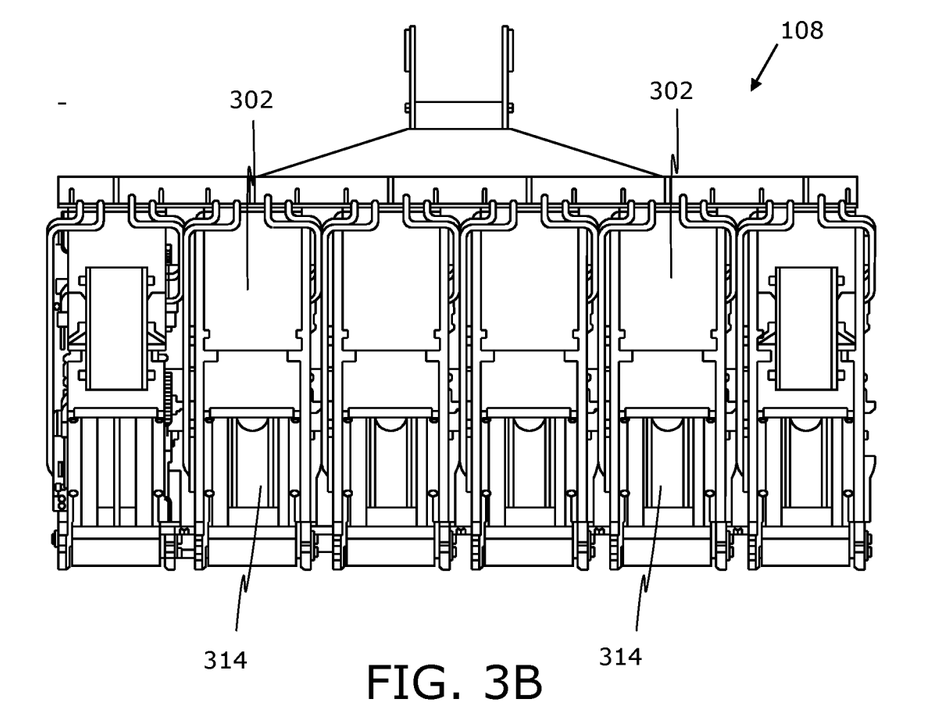
FIG. 3B is a front view illustration of the cable feeding unit of the cable management system of FIG. 3A.

FIG. 3B is a front view illustration of the cable feeding unit 108 of the cable management system 100 of FIG. 3A, in accordance with another embodiment of the present disclosure. Herein, the cable feeding unit 108 includes six feeding sections 302. Each feeding section has an inlet opening 314 through which the cable may enter the cable feeding unit 108. The multiple feeding sections 302 help in reeling in or reeling out one or more cables independently.

Figure 4A:
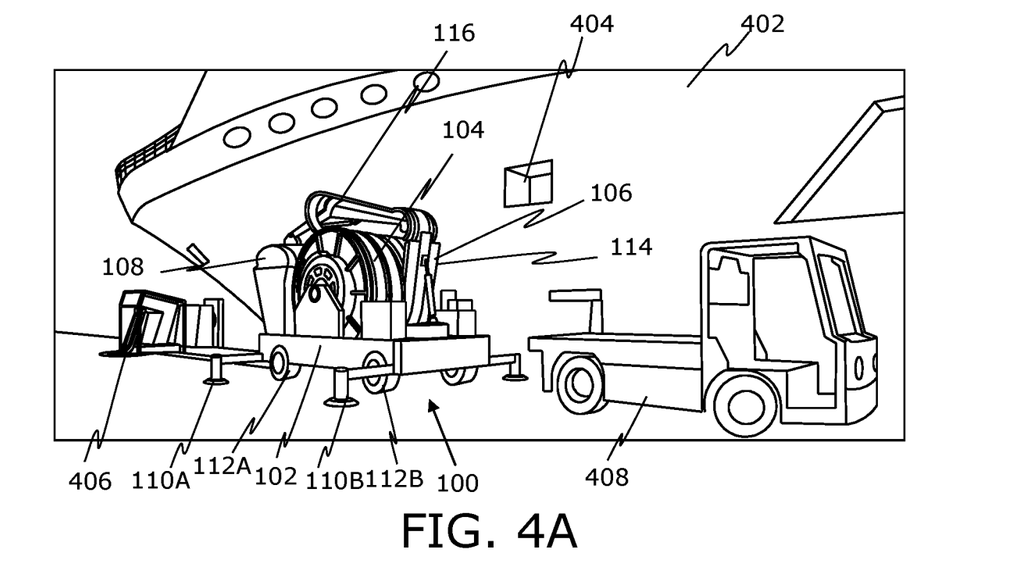
FIG. 4A is a diagrammatic view illustration of an implementation of the cable feeding unit of the cable management system in a non-operational position, in accordance with an embodiment of the present disclosure.

FIG. 4A is a diagrammatic view illustration of an implementation of the cable feeding unit of the cable management system in a non-operational position for transferring the cables to a vessel 402 to supply vessel 402 with electrical power, in accordance with an embodiment of the present disclosure. The vessel 402 includes a hatch 404 of an electrical connection cabinet in the vessel through which electrical power may be received by the vessel 402. An electrical station 406 is positioned on a shore for supplying electrical power. The cable management system comprises a cable feeding unit 108 and outriggers 110A and 110B, a platform 102 including wheels 112A and 112B for moving the platform alongside a vessel. The cable reel 104 is supported on the platform 102 and have one or more cables reeled therein. The boom 106 is rotatably mounted on the platform 102 from a first end 114 to allow for a second end 116 thereof to be movable in a direction alongside the vessel. The cable feeding unit 108 is mounted at the second end 116 of the boom 106. The outriggers 110A and 110B are associated with the platform 102 and are configured to be deployed to stabilize the platform 102 when the boom 106 is rotated so as to cause the cable feeding unit 108 to be disposed adjacent to the electrical connection in the vessel. It may be observed from FIG. 1A that the cable management system 100 is in the non-operational position. Herein, the boom 106 is folded and the outriggers 110A and 110B are not deployed so as to make the cable management system 100 compact and easy for transportation. The platform 102 is moved alongside the vessel 402 by a tow truck 408. As, the platform 102 is moved forward, the one or more cables are reeled out from the cable management system 100 for supplying electrical power through hatch 404 of the electrical connection cabinet in the vessel 402.

Figure 4B:
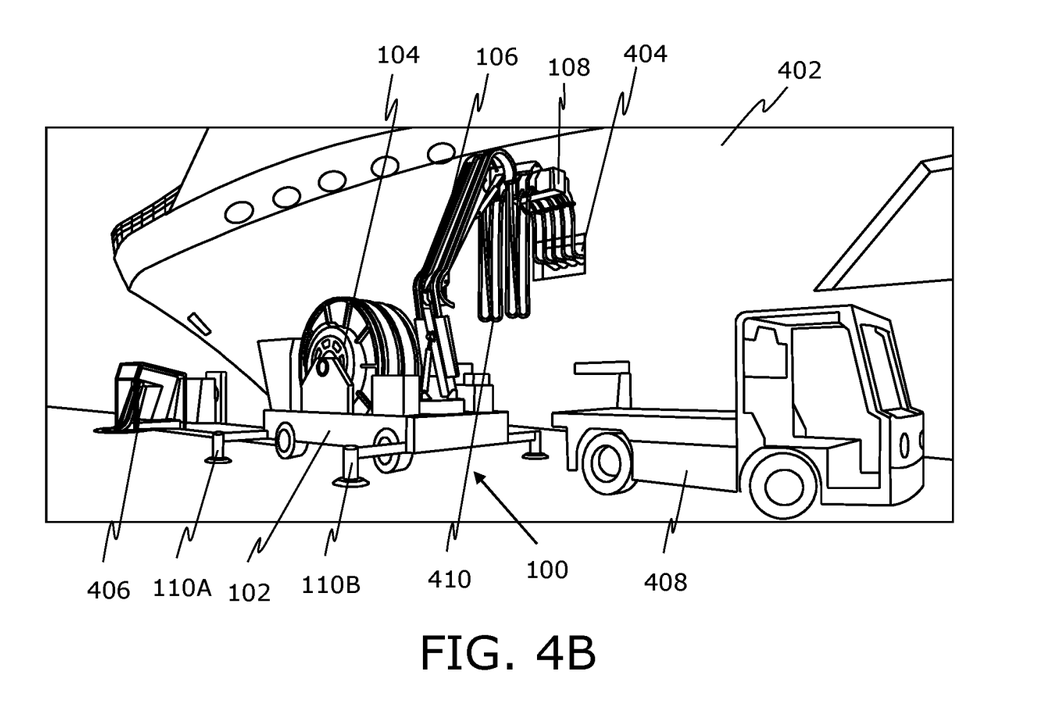
FIG. 4B is a diagrammatic view illustration of an implementation of the cable feeding unit of the cable management system of FIG. 4A in an operational position, in accordance with an embodiment of the present disclosure.

FIG. 4B is a diagrammatic view illustration of an implementation of the cable feeding unit of the cable management system of FIG. 4A in an operational position electrically connected through the hatch 404 to the electrical connection cabinet in the vessel 402, in accordance with an embodiment of the present disclosure. Herein, the platform 102 has been positioned alongside the vessel 402 and hence, the operation of the tow truck 408 may be stopped. Once the platform 102 is moved near the hatch 404 of the electrical connection cabinet in the vessel 402, first free end of one or more cables 410 are connected to the electrical station 406. Next, the boom 106 is stretched out and rotated so as to cause the cable feeding unit 108 to be disposed adjacent to the hatch 404 of the electrical connection cabinet in the vessel 402. The outriggers 110A and 110B are deployed to stabilize the platform 102. The one or more cables 410 are reeled out from the cable reel 104 so that the second free end of the one or more cables 410 reach through hatch 404 of the electrical connection cabinet to be electrically connected with the vessel 402 for supplying the electrical power. The boom 106 is extended and is operated for rotating the boom 106 in order to dispose of the cable feeding unit 108 adjacent to the electrical connection in the vessel. Further, the outrigger 110B is shown to be deployed for supporting the cable management system 100.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present.

The invention claimed is:

1. A cable feeding unit of a cable management system, the cable feeding unit comprising one or more feeding sections, wherein the one or more feeding sections comprise;
   a body having a first end and a second end, a first side structure and a second side structure between the first end and the second end, and an inlet opening of a cable in the first end, and an outlet opening of the cable in the second end;
   one or more pairs of sheave rollers attached between the first side structure and the second side structure, wherein the one or more pair of sheave rollers comprises a first sheave roller and a second sheave roller facing with rim parts to one another;
   a cable feeding passage formed at least between a rim part of the first sheave roller and a rim part of the second sheave roller of the one or more pairs of sheave rollers;
   one or more drives connected to at least one of the sheave rollers;

one or more transmission mechanisms connecting the one or more drives with at least the first sheave roller or the second sheave roller;

two or more pairs of sheave rollers attached between the first side structure and the second side structure and two or more transmission mechanisms comprising at least one first circumferentially elongated element and at least one second circumferentially elongated element; and wherein the at least one first circumferentially elongated element is arranged around rim parts of two or more of the first sheave roller and the at least one second circumferentially elongated element is arranged around the rim parts of two or more of the second sheave roller.

2. The cable feeding unit according to claim 1, wherein the one or more feeding sections comprises one or more supporting rollers.

3. The cable feeding unit according to claim 2, wherein the one or more transmission mechanisms comprises a shaft or a drive pulley connecting the one or more drives with at least the first sheave roller or the second sheave roller.

4. The cable feeding unit according to claim 1, wherein at least one of the first circumferentially elongated element or at least one of the second circumferentially elongated element comprises a tensioner.

5. The cable feeding unit according to claim 1, wherein the cable feeding passage is formed between the at least one first circumferentially elongated element arranged around first guiding rollers and the at least one second circumferentially elongated element arranged around second guiding rollers.

6. The cable feeding unit according to claim 1, wherein the at least one sheave roller comprises a roller tensioner.

7. The cable feeding unit according to claim 1, wherein the two or more pairs of sheave rollers comprises at least one pair of driving rollers and at least one pair of driven rollers.

8. The cable feeding unit according to claim 1, wherein the one or more drives comprise one or more of a hydraulic drive, an electric drive, a servo-motor, an actuator.

9. The cable feeding unit according to claim 1, wherein the one or more drives is connected by a rotating shaft with at least one sheave roller of the one or more pairs of sheave rollers, or the one or more drives is integrated inside one or more sheave guiding rollers.

10. The cable feeding unit according to claim 1, wherein the one or more feeding sections comprises at least one of a camera, an anti-collision means, adaptive reeling means, data communication means, one or more control means of the drives, remote diagnostics means.

11. The cable feeding unit according to claim 1, wherein the cable feeding unit comprises connection means to connect the cable feeding unit with a boom of the cable management system.

12. The cable feeding unit according to claim 1, wherein one or more cable guiding rollers are attached at least to the inlet opening or the outlet opening.

13. The cable feeding unit according to claim 1, wherein the first end of the one or more feeding sections comprises at least one fender.

14. The cable feeding unit according to claim 1, wherein the second end comprises one or more bumpers.

* * * * *